(12) United States Patent
Johnson et al.

(10) Patent No.: US 8,689,553 B2
(45) Date of Patent: Apr. 8, 2014

(54) EXHAUST GAS RECIRCULATION SYSTEM FOR AN INTERNAL COMBUSTION ENGINE

(75) Inventors: Timothy J. Johnson, Clarkston, MI (US); Scott Igram, Burton, MI (US); Carl Eric Fonville, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 85 days.

(21) Appl. No.: 13/235,731

(22) Filed: Sep. 19, 2011

(65) Prior Publication Data

US 2012/0180478 A1 Jul. 19, 2012

Related U.S. Application Data

(60) Provisional application No. 61/433,585, filed on Jan. 18, 2011.

(51) Int. Cl.
*F02M 25/07* (2006.01)

(52) U.S. Cl.
USPC ..................... 60/605.2; 123/568.17

(58) Field of Classification Search
USPC .............. 60/605.2; 137/888, 896; 123/568.17
IPC ......................................................... F02M 5/07
See application file for complete search history.

(56) References Cited

U.S. PATENT DOCUMENTS

| | | | | |
|---|---|---|---|---|
| 1,539,126 A * | 5/1925 | Link | .......................... | 123/568.17 |
| 1,632,881 A * | 6/1927 | Burtnett | ..................... | 123/568.17 |
| 3,680,534 A * | 8/1972 | Chavant | ..................... | 123/568.17 |
| 4,123,800 A * | 10/1978 | Mazzei | .......................... | 137/888 |
| 4,461,150 A | 7/1984 | Grohn | | |
| 5,611,204 A * | 3/1997 | Radovanovic et al. | ...... | 60/605.2 |
| 5,863,128 A * | 1/1999 | Mazzei | .......................... | 137/888 |
| 6,003,316 A * | 12/1999 | Baert et al. | ..................... | 60/605.2 |
| 6,216,458 B1 * | 4/2001 | Alger et al. | ................... | 60/605.2 |
| 6,237,336 B1 * | 5/2001 | Feucht et al. | ................. | 60/605.2 |
| 6,267,106 B1 * | 7/2001 | Feucht | ..................... | 123/568.17 |
| 6,272,851 B1 | 8/2001 | Mori et al. | | |
| 6,425,382 B1 * | 7/2002 | Marthaler et al. | ........ | 123/568.17 |
| 6,427,671 B1 * | 8/2002 | Holze et al. | .............. | 123/568.17 |
| 6,502,397 B1 * | 1/2003 | Lundqvist | ..................... | 60/605.2 |
| 6,609,373 B2 * | 8/2003 | Coleman et al. | ............. | 60/605.2 |

(Continued)

FOREIGN PATENT DOCUMENTS

| | | | | | |
|---|---|---|---|---|---|
| DE | | 4429232 C1 * | 9/1995 | ............. | F02M 25/07 |
| EP | | 857870 A2 * | 8/1998 | ............. | F02M 25/07 |

(Continued)

OTHER PUBLICATIONS

Office Action regarding related CN App. No. 2012100151106; dated Dec. 13, 2013; 9 pgs.

*Primary Examiner* — Thai Ba Trieu
*Assistant Examiner* — Ngoc T Nguyen
(74) *Attorney, Agent, or Firm* — Cantor Colburn LLP

(57) ABSTRACT

An internal combustion engine comprises an intake system to deliver a compressed intake charge thereto. A venturi assembly is disposed in the intake system and defines a venturi defining a low pressure zone "Z" for the intake charge passing therethrough. An annular exhaust gas recirculation conduit distribution passage extends circumferentially about an inlet annulus of an intake manifold and receives diverted exhaust gas from an exhaust system for delivery to the intake charge through exhaust gas recirculation diffuser passages disposed at circumferentially spaced locations about the annular exhaust gas recirculation conduit distribution passage.

14 Claims, 6 Drawing Sheets

(56) References Cited

U.S. PATENT DOCUMENTS

| | | | |
|---|---|---|---|
| 6,609,374 B2 * | 8/2003 | Feucht et al. | 60/605.2 |
| 6,640,542 B2 * | 11/2003 | Rampenthal et al. | 60/605.2 |
| 6,729,315 B2 * | 5/2004 | Onodera et al. | 60/605.2 |
| 6,732,524 B2 * | 5/2004 | Sponton | 60/605.2 |
| 6,742,335 B2 * | 6/2004 | Beck et al. | 60/605.2 |
| 7,028,680 B2 * | 4/2006 | Liu et al. | 123/568.17 |
| 7,140,357 B2 * | 11/2006 | Wei et al. | 123/568.17 |
| 7,353,811 B2 * | 4/2008 | Weisz | 123/568.17 |
| 7,389,770 B2 * | 6/2008 | Bertilsson et al. | 123/568.17 |
| 7,552,722 B1 * | 6/2009 | Shieh et al. | 123/568.17 |
| 7,568,340 B2 * | 8/2009 | Marsal et al. | 60/605.2 |
| 7,845,340 B2 * | 12/2010 | Fuchinoue et al. | 123/568.17 |
| 8,001,780 B2 * | 8/2011 | Onodera | 60/606 |
| 8,033,714 B2 * | 10/2011 | Nishioka et al. | 366/163.2 |
| 8,056,340 B2 * | 11/2011 | Vaught et al. | 60/605.2 |
| 2003/0111065 A1 * | 6/2003 | Blum | 123/568.17 |
| 2009/0165755 A1 * | 7/2009 | Shieh et al. | 123/568.17 |
| 2011/0173954 A1 * | 7/2011 | Wenzel | 60/278 |
| 2011/0265772 A1 * | 11/2011 | Teng et al. | 123/568.11 |
| 2012/0216530 A1 * | 8/2012 | Flynn et al. | 60/605.2 |

FOREIGN PATENT DOCUMENTS

| | | | | | |
|---|---|---|---|---|---|
| GB | 2356223 A | * | 5/2001 | | F02M 25/07 |
| JP | 11324812 A | * | 11/1999 | | F02M 25/07 |
| JP | 2013087720 A | * | 5/2013 | | F02M 25/07 |

* cited by examiner

EXHAUST GAS RECIRCULATION SYSTEM FOR AN INTERNAL COMBUSTION ENGINE

CROSS-REFERENCES TO RELATED APPLICATIONS

This patent application claims priority to U.S. Patent Application Ser. No. 61/433,585 filed Jan. 18, 2011 which is hereby incorporated herein by reference in its entirety.

FIELD OF THE INVENTION

Exemplary embodiments of the invention relate to an exhaust gas recirculation system for an internal combustion engine and, more particularly, to a system for efficiently providing recirculated exhaust gas to a high pressure intake system of an internal combustion engine.

BACKGROUND

Exhaust Gas Recirculation ("EGR") is an important element for both diesel and gasoline engines, particularly engines utilizing charge air boosting or compression (ex. exhaust driven turbocharger or engine driven supercharger,) for both fuel consumption improvements and for the reduction of regulated tailpipe exhaust gas emissions.

In engines utilizing an exhaust driven turbocharger or engine driven supercharger, high pressure EGR may be diverted from a location upstream of the turbocharger and is supplied to the compressed intake charge during high load operation. However, during high load operation of the internal combustion engine, the pressure differential ("$\Delta P$") between the EGR supply and the compressed intake charge may be negative. Specifically, the supply pressure of the EGR may drop below that of the compressed intake charge making it difficult, if not impossible, to supply EGR to the intake system ($P_{INTAKE} > P_{EGR}$).

It has been proposed to utilize a venturi system in the intake system to decrease the intake pressure to allow for the $\Delta P$ between the EGR supply and the compressed intake charge to be momentarily positive allowing for the delivery of EGR to the intake system under high load operation. In such an instance, including operation of the engine at other than high loads, an even delivery and distribution of the EGR is desirable.

SUMMARY OF THE INVENTION

In an exemplary embodiment, an internal combustion engine comprises an intake system to deliver a compressed intake charge to the internal combustion engine, a venturi assembly disposed in the intake system defines a venturi defining a low pressure zone "Z" for the intake charge passing therethrough and an annular exhaust gas recirculation conduit distribution passage extends circumferentially about the venturi and receives diverted exhaust gas from an exhaust system for delivery to the intake charge through exhaust gas recirculation diffuser passages disposed at circumferentially spaced locations about the annular exhaust gas recirculation conduit distribution passage.

In another exemplary embodiment an internal combustion engine comprises an intake system having an intake manifold for to deliver a compressed intake charge to cylinders of the internal combustion engine. An exhaust system has an exhaust manifold configured to deliver exhaust gas from the cylinders of the internal combustion engine to a compressor that is located in fluid communication therewith. The compressor includes a turbine housing, with a high pressure inlet for the exhaust gas, that is in fluid communication, through an exhaust gas recirculation conduit, with the intake system to deliver diverted exhaust gas to the intake manifold, and a compressor housing, with a high pressure outlet, that is in fluid communication with the intake system, through an intake charge conduit, to deliver a compressed intake charge to the intake manifold. A throttle body is disposed between the intake charge conduit and the intake manifold. A venturi assembly is disposed downstream of the throttle body and comprises an inlet having a flow passage with a sectional diameter "A" that receives the intake charge therethrough and an outlet comprising a nozzle section having a sectional diameter "$A_1$" defining a venturi. An intake manifold inlet in fluid communication with the venturi assembly receives the intake charge exiting therefrom through the venturi. An inlet annulus extends centrally through the intake manifold inlet, and comprises a diameter "D" at its inlet end that is equal to the sectional diameter "$A_1$" of the nozzle section wherein the inlet annulus 84 extends axially a distance "L" through which its diameter increases to a second diameter "$D_2$" resulting in a low pressure zone "Z" for the intake charge passing therethrough. An annular exhaust gas recirculation conduit distribution passage extends circumferentially about the inlet annulus and is in fluid communication through an inlet with the exhaust gas recirculation conduit for receipt of diverted exhaust gas from the exhaust system and exhaust gas recirculation diffuser passages are disposed at circumferentially spaced locations about the annular exhaust gas recirculation conduit distribution passage; the exhaust gas recirculation diffuser passages defining spaced passages for the inlet and even distribution of diverted exhaust gas from the annular exhaust gas recirculation distribution passage and into the intake charge passing through the low pressure zone "Z" of the inlet annulus of the intake manifold.

The above features and advantages, and other features and advantages of the invention are readily apparent from the following detailed description when taken in connection with the accompanying drawings.

BRIEF DESCRIPTION OF THE DRAWINGS

Other features, advantages and details appear, by way of example only, in the following detailed description of the embodiments, the detailed description referring to the drawings in which.

DESCRIPTION OF THE EMBODIMENTS

Figure 1:
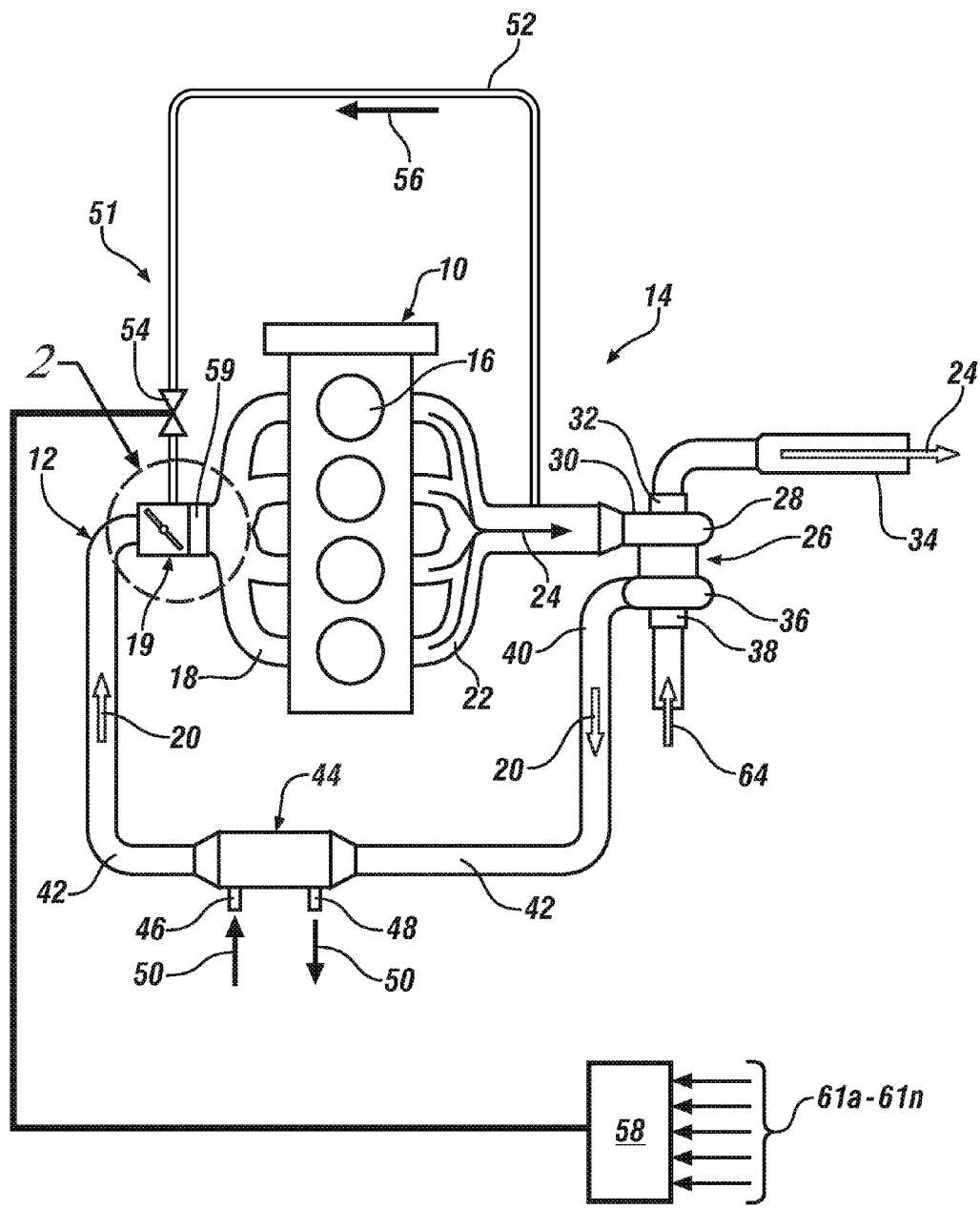
FIG. 1 is a schematic view of an internal combustion engine system comprising an exhaust gas recirculation system and an intake charge system embodying features of the invention.

The following description is merely exemplary in nature and is not intended to limit the present disclosure, its application or uses. It should be understood that throughout the drawings, corresponding reference numerals indicate like or corresponding parts and features.

Referring to FIG. 1, an exemplary embodiment is directed to an internal combustion engine 10, in this case an in-line 4 cylinder engine, including an intake system 12 and an exhaust system 14. The internal combustion engine includes a plurality of cylinders 16 into which a combination of an intake charge and fuel are introduced. The intake charge/fuel mixture is combusted in the cylinders 16 resulting in reciprocation of pistons (not shown) therein. The reciprocation of the pistons rotates a crankshaft (not shown) to deliver motive power to a vehicle powertrain (not shown) or to a generator or other stationary recipient of such power (not shown) in the case of a stationary application of the internal combustion engine 10.

The internal combustion engine 10 includes an intake manifold 18, in fluid communication with the cylinders 16 that receives a compressed intake charge 20 from the intake system 12 through a throttle body assembly 19 and delivers the charge to the plurality of cylinders 16. The exhaust system 14 includes an exhaust manifold 22, also in fluid communication with the cylinders 16 that is configured to remove the combusted constituents of the intake charge/fuel mixture (i.e. exhaust gas 24) and to deliver it to a compressor 26 such as the exhaust driven turbocharger that is located in fluid communication therewith. In another exemplary embodiment, it is contemplated that the compressor 26 may also comprise an engine driven supercharger without deviating from the scope of the invention. The exhaust driven turbocharger 26 includes an exhaust gas turbine (not shown) that is housed within a turbine housing 28. The turbine housing 28 includes a high pressure turbine housing inlet 30 and a low pressure turbine housing outlet 32. The low pressure turbine housing outlet 32 is in fluid communication with the remainder of the exhaust system 14 and delivers the exhaust gas 24 to an exhaust gas conduit 34 which may include various exhaust aftertreatment devices (not shown) that are configured to treat various regulated constituents of the exhaust gas 24 prior to its release to the atmosphere.

The exhaust driven turbocharger 26 also includes a combustion charge compressor wheel (not shown) that is housed within a compressor housing 36. The compressor housing 36 includes a low pressure inlet 38 that is typically in fluid communication with ambient air 64 and a high pressure outlet 40. The high pressure outlet 40 is in fluid communication with the intake system 12 and delivers the compressed intake charge 20 through an intake charge conduit 42 to the intake manifold 18 for delivery to the cylinders 16 of the internal combustion engine 10. In an exemplary embodiment, disposed inline of intake charge conduit 42, between the outlet 40 of the compressor housing 36 and the intake manifold 18, is an intake charge cooler 44. The intake charge cooler 44 receives heated (due to compression) compressed intake charge 20 from the intake charge conduit 42 and, following cooling of the compressed intake charge 20 therein, delivers it to the intake manifold 18 through a subsequent portion of the intake charge conduit 42. The intake charge cooler 44 may comprise an inlet 46 and an outlet 48 for the circulation of a cooling medium 50 (such as a typical glycol-based automotive coolant or ambient air) therethrough. In a known manner, the intake charge cooler 44 transfers heat from the compressed intake charge 20 to the cooling medium 50 to thereby reduce the temperature and increase the density of the compressed intake charge 20 as it transits the intake charge cooler 44.

Located in fluid communication with the exhaust system 14, and in the exemplary embodiment shown in FIG. 1, is an exhaust gas recirculation ("EGR") system 51, including an EGR conduit 52 that is in fluid communication with the high pressure turbine housing inlet 30 for diversion of high pressure (i.e. upstream of the turbocharger inlet) exhaust gas 24 therefrom. The EGR conduit 52 is located on the upstream, high pressure side of the exhaust driven turbocharger 26, and is configured to divert a portion of the exhaust gas 24 from the turbine housing inlet and to return it to, or recirculate it to, the intake system 12, as will be further described herein. In the embodiment shown in FIG. 1, the EGR conduit 52 extends between the turbine housing inlet 30 and the intake system 12 where it is, in an exemplary embodiment, fluidly connected downstream of the throttle body assembly 19. An EGR valve 54 is fluidly connected to the EGR conduit 52 and is configured to control the flow of diverted exhaust gas 56 therethrough and to the intake system 12 of the internal combustion engine 10.

The EGR valve 54 is in signal communication with a control module such as engine controller 58 that is configured to operate the EGR valve 54 to adjust the volumetric quantity of diverted exhaust gas 56 that is introduced to the intake system 12, based on the particular engine operating conditions at any given time. The engine controller 58 collects information regarding the operation of the internal combustion engine 10 from sensors 61a-61n, such as the temperature of the exhaust system, engine coolant, compressed combustion charge, ambient, etc., as well as pressure, exhaust system conditions and driver demand to determine the appropriate, if any, flow of diverted exhaust gas 56 to be recirculated to the intake system 12 of the internal combustion engine 10 through the EGR conduit 52.

Figure 2:
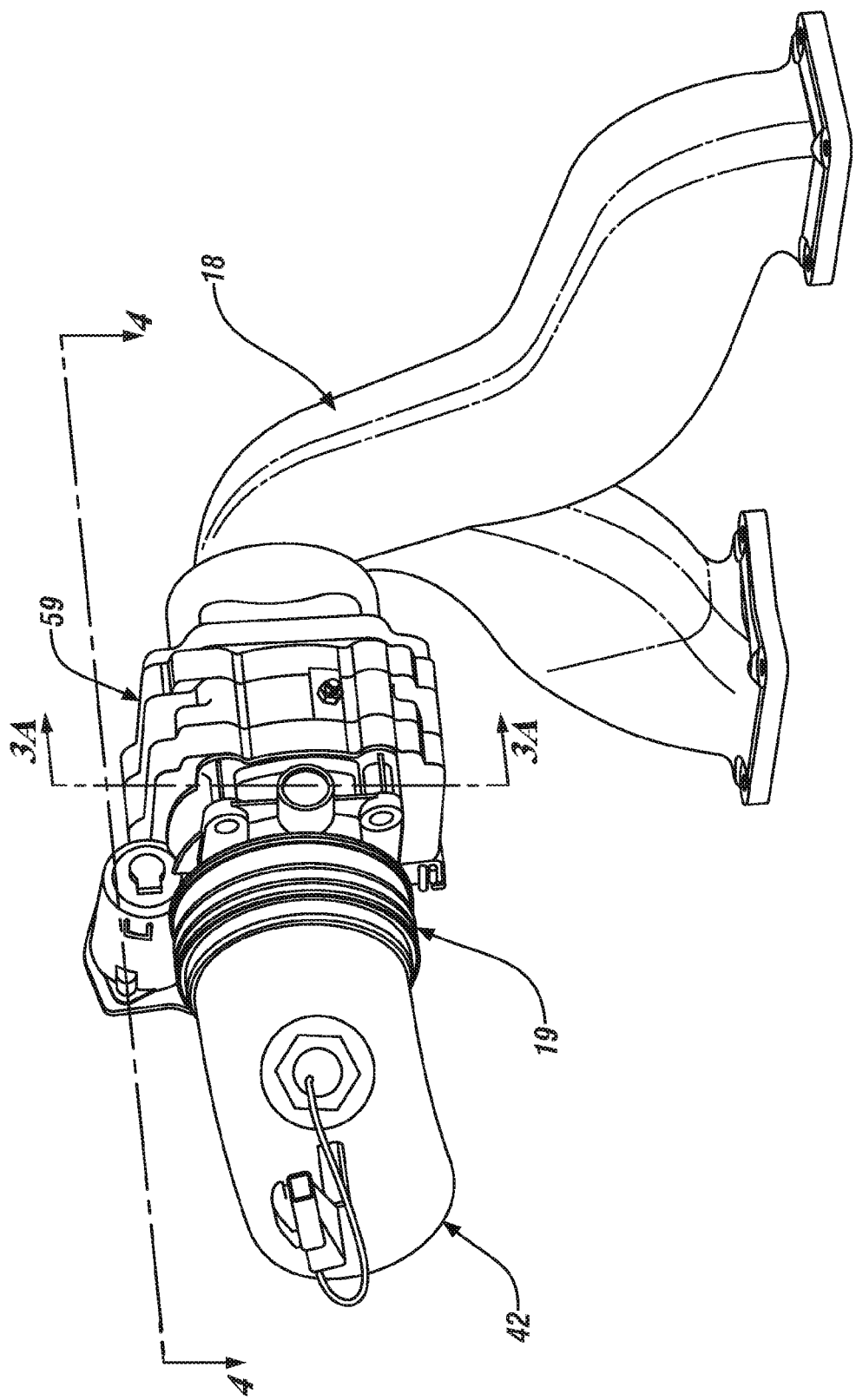
FIG. 2 is an enlarged perspective view of a portion of the internal combustion engine system of FIG. 1, taken at Circle 2, embodying features of the invention.
Figure 3A:
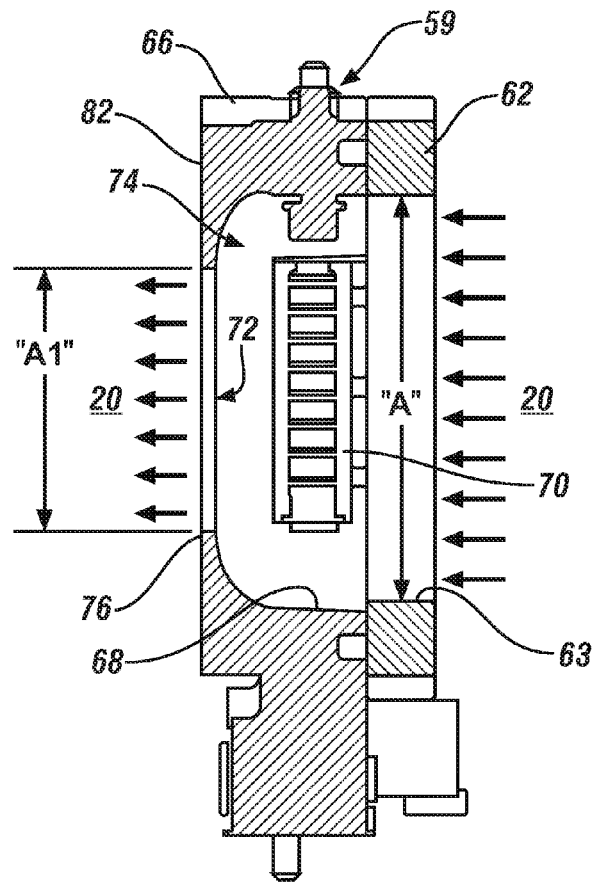
FIG. 3A is a sectional view of a venturi assembly taken at line 3A-3A of FIG. 2.
Figure 3B:
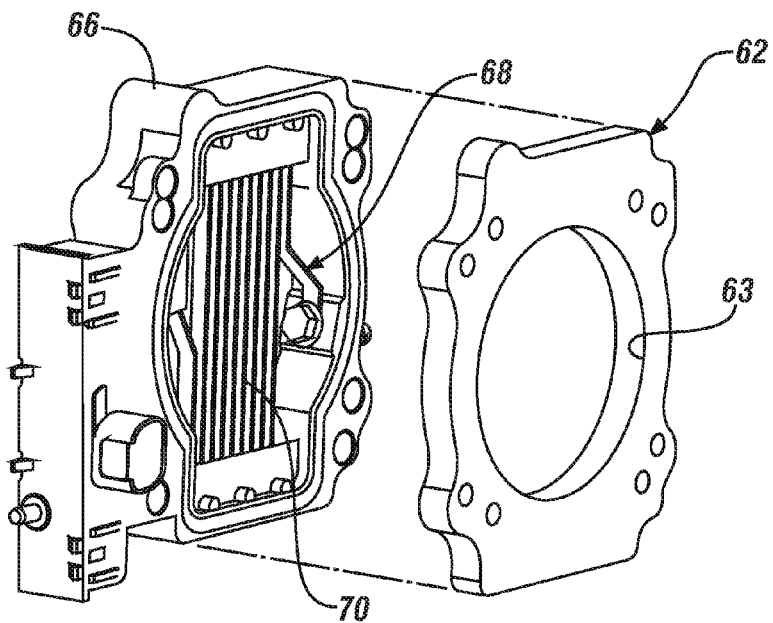
FIG. 3B is a partially disassembled view of the venturi assembly of FIG. 3A.
Figure 4:
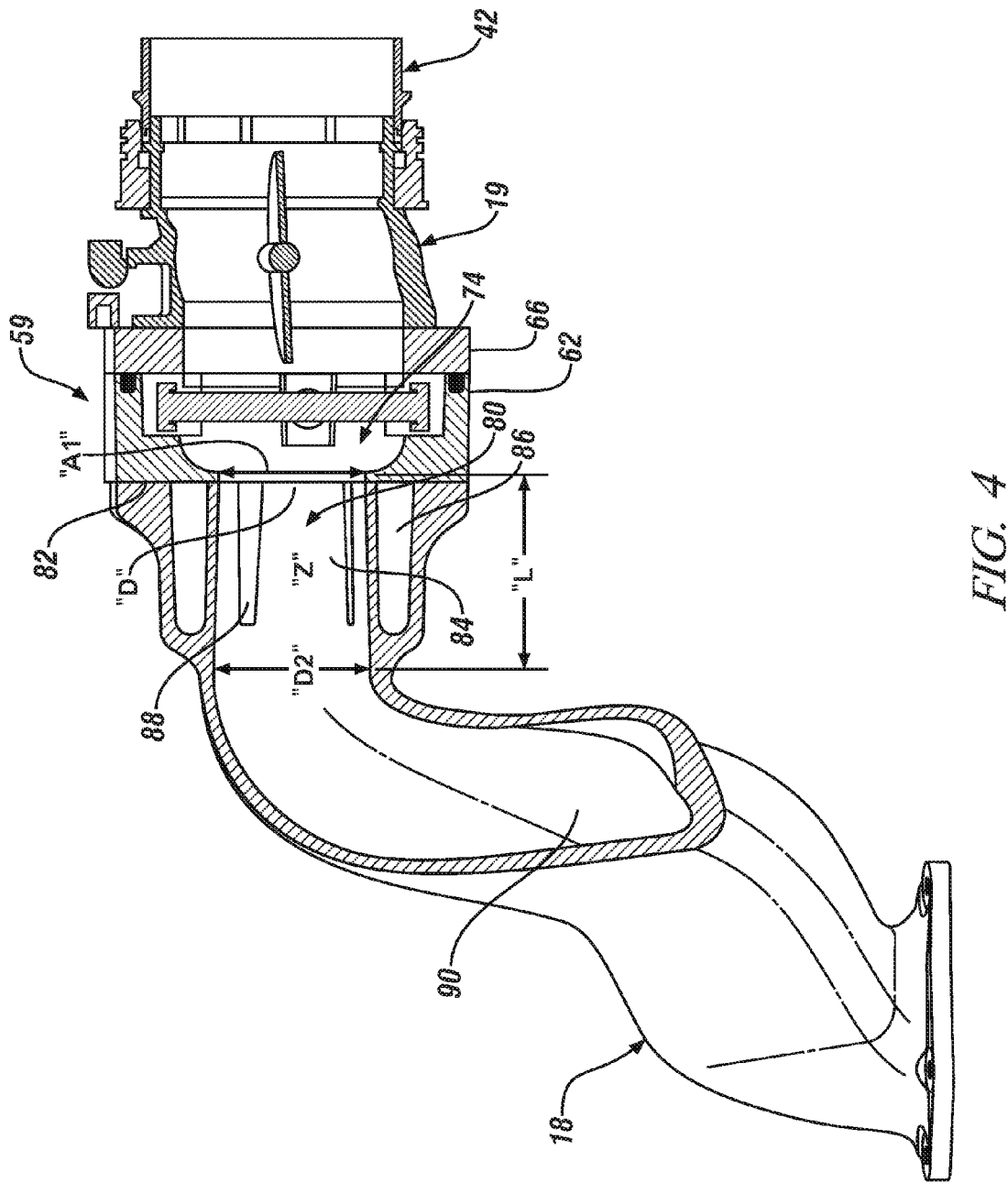
FIG. 4 is a sectional view of the portion of the internal combustion engine system of FIG. 2 taken at line 4-4.
Figure 5:
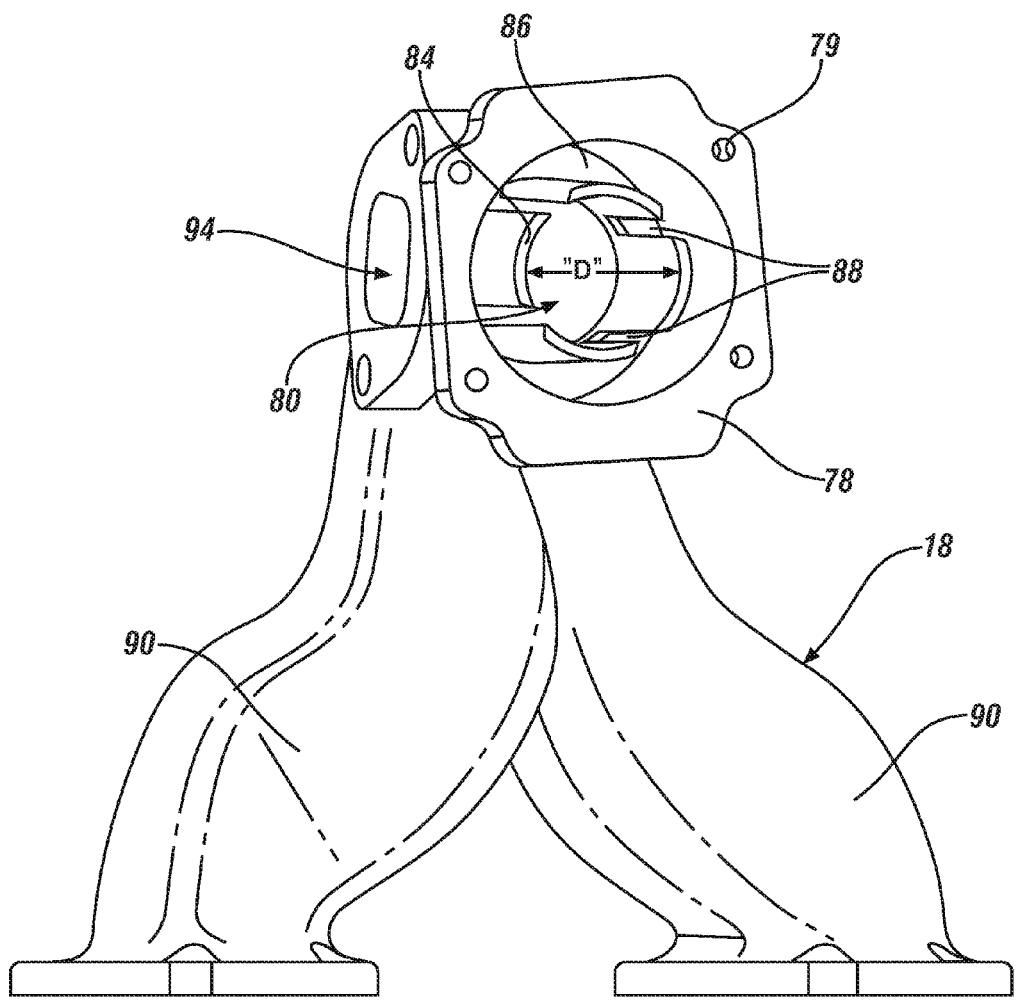
FIG. 5 is a perspective view of an intake manifold of the internal combustion engine system of FIG. 1.
Figure 6:
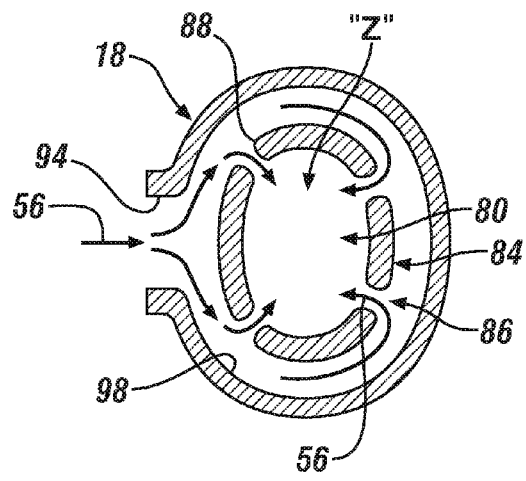
FIGS. 6-9 are various embodiments of the intake manifold of FIG. 5 embodying features of the invention.

Referring now to FIG. 2, in an exemplary embodiment, the intake system 12 further comprises the intake charge cooler 44, FIG. 1, as described above, the intake charge conduit 42, the throttle body assembly 19, a venturi nozzle assembly 59 and, an intake manifold 18 for delivery of the intake charge 20 to the internal combustion engine 10. Other configurations and combinations of the above are contemplated without deviating from the scope of the invention. FIGS. 3A and 3B illustrate an exemplary embodiment of the venturi nozzle assembly 59 which, in the exemplary embodiment illustrated, also includes a mechanism to heat the intake charge 20. The venturi nozzle assembly 59 comprises an inlet 62 having a flow passage 63 that is fluidly coupled to the outlet (not shown) of the throttle body assembly 19 and receives the intake charge 20 therethrough. A heater module 66 having a flow passage 68 receives the intake charge 20 from the inlet 62 and includes heating elements 70 that operate upon signal command from the controller 58 to heat the intake charge during predefined engine operating conditions. The heater module 66 includes an outlet 72 comprising a nozzle section 74 which, in the exemplary embodiment illustrated is a bell-mouth-shaped nozzle section that operates to define a venturi 76 therein. It is contemplated that other nozzle shapes, such as cone shapes, may be selected depending upon the axial space limitations of the intake system 12 without deviating from the scope of the invention. The venturi 76 is defined by a contraction ratio which is the ratio of the sectional diameter ("A") of the flow passage 68 of the heater module 66 to the sectional diameter ("$A_1$") of the nozzle section 74 or (contraction ration=$A_1/A$).

Referring to FIGS. 3A and 3B, 4, 5 and 6 in an exemplary embodiment the intake manifold 18 includes a flanged portion 78 defining an inlet 80. The flanged portion 78 is configured to sealingly engage with the downstream end 82 of the heater module 66 and to receive, through the inlet 80, the intake charge 20 exiting through the venturi 76. The flanged portion 78 of the intake manifold 18 may be fixed to the downstream end 82 of the heater module 66 using suitable fasteners (not shown) that pass through fastener openings 79. An inlet annulus 84 extends centrally through the inlet 80 and comprises a diameter ("D") at its inlet end that is equal to the sectional diameter ("$A_1$") of the nozzle section 74. The inlet annulus 84 extends axially a distance ("L") through which its diameter increases to a second diameter ("$D_2$") resulting in a pressure drop or low pressure zone ("Z") for the intake charge 20 passing therethrough; thus completing the venturi and the venturi effect. In the exemplary embodiment illustrated, an annular EGR distribution passage 86 extends circumferentially about the inlet annulus 84 and is in fluid communication through inlet 94 with EGR conduit 52 for receipt of diverted exhaust gas 56 from the exhaust system 14. In an exemplary embodiment, the inlet annulus comprises a series of EGR diffuser passages 88 disposed at circumferentially spaced locations thereabout. The EGR diffuser passages 88 define spaced passages for the inlet and even distribution of diverted exhaust gas 56 from the annular EGR distribution passage 86 and into the intake charge 20 passing through the inlet annulus 84 prior to its flow progression into the intake runner or runners 90. The combination of the low pressure zone "Z" and the evenly distributed injection of diverted exhaust gas 56 provides for well distributed and mixed delivery of exhaust gas to the intake charge 20 in a compact (i.e. axially compact) space in the intake system 12 of the internal combustion engine 10.

Figure 7:
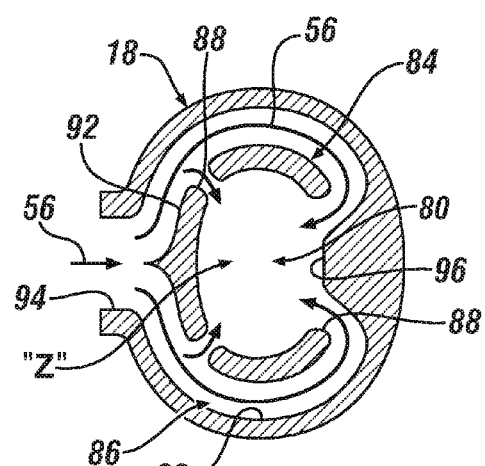

Referring now to FIG. 7, in an alternative exemplary embodiment, the inlet annulus 84 may comprise a flow director or septum 92 that is located adjacent to the inlet 94 thereof. The flow director 92 is configured to assist in even distribution of the diverted exhaust gas 56 entering the annulus 84 thereby resulting in an improved distribution of the exhaust gas to the EGR diffuser passages 88. Similarly, a second flow director 96 may be disposed diametrically opposite of the flow director 92, extending radially inwardly from the inner wall 98 of the annular EGR distribution passage 86. In a preferred embodiment, the second flow director 96 is situated adjacent to an EGR diffuser passage 88 and is configured to direct diverted exhaust gas 56 through the EGR diffuser passage and into the inlet 80 of the intake manifold 18. Additionally, the flow directors 92, 96 are configured to prevent low-flow zones within the annular EGR distribution passage 86 which could lead to a build-up of exhaust gas debris and clogging of the passage.

Figure 8:
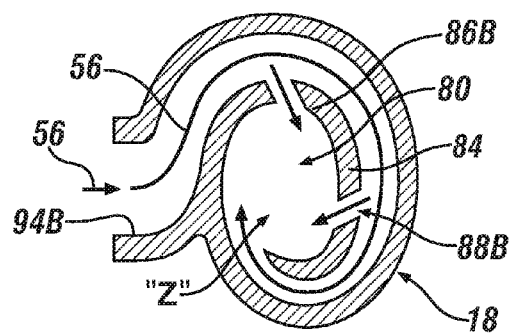
Figure 9:
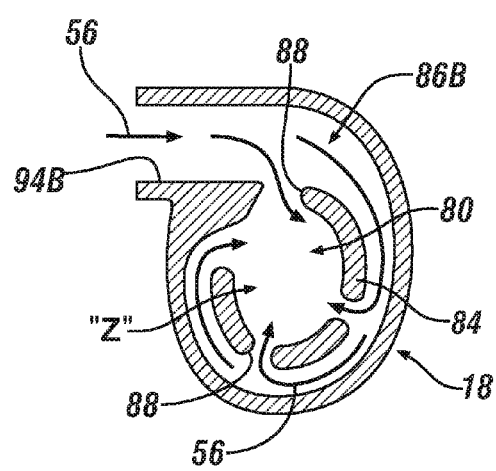

Referring now to FIGS. 8 and 9, in alternative exemplary embodiments, the inlet of the annular EGR distribution passage 86 may be configured as an offset diverted exhaust gas entrance 94B associated with a spiral-shaped annular EGR distribution passage 86B. The offset diverted exhaust gas entrance 94B may operate to accelerate the flow of the diverted exhaust gas 56 around the inlet annulus 84 for improved distribution of the exhaust gas about the circumference thereof. In the embodiment illustrated in FIG. 8, flow directing EGR diffuser passages 88B are configured to define varying flow characteristics (e.g. swirl, tumble, etc.) in the diverted exhaust gas 56 as it mixes with the intake charge 20.

While the invention has been described thus far to include a venturi having a low pressure zone "Z" to facilitate the delivery of diverted exhaust gas 56 to the intake manifold 18 of the intake system 12, it is contemplated that in some applications of the internal combustion engine 10, the use of the venturi 76 and the venturi nozzle assembly 59 may not be required. In such cases, the inlet annulus 84 having an annular EGR distribution passage 86 extending circumferentially about the inlet annulus 84 and in fluid communication through inlet 94 with EGR conduit 52 for receipt of diverted exhaust gas 56 from the exhaust system 14 may still be utilized to deliver exhaust gas, through a series of EGR diffuser passages 88 disposed at circumferentially spaced locations about the annulus and to the intake system, without deviating from the scope of the invention. In addition it is contemplated that, in such a case, the inlet annulus 84 may be disposed about a portion of the intake system 12 other than the intake manifold 18; such as the throttle body assembly 19 or the intake charge conduit 42.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. An internal combustion engine comprising:
    an exhaust system to discharge exhaust gas from the internal combustion engine;
    an intake system to deliver a compressed intake air to the internal combustion engine; and
    an inlet annulus comprising an inlet end, an outlet end, and a plurality of EGR diffuser passages extending through the inlet annulus, the inlet end of the inlet annulus having a first diameter (D) that is smaller than a second diameter (D2) of the outlet end of the inlet annulus, wherein the inlet annulus defines an annular exhaust gas recirculation (EGR) conduit distribution passage extending circumferentially about the inlet annulus and configured to receive diverted exhaust gas from the exhaust system for delivery to a low pressure zone (Z) where the compressed intake air passes through the plurality of said EGR diffuser passages, the plurality of said EGR diffuser passages disposed through a wall of the inlet annulus at circumferentially spaced locations about the annular EGR conduit distribution passage.

2. The internal combustion engine of claim 1, wherein the annular exhaust gas recirculation conduit distribution passage is integral with and extends about the opening of an inlet intake manifold in fluid communication with the intake system.

3. The internal combustion engine of claim 1, further comprising an exhaust driven turbocharger in fluid communication with the exhaust system and the intake system and configured to deliver the compressed intake air to the intake system.

4. The internal combustion engine of claim 3, further comprising a compressed intake air cooler disposed in the intake system between the exhaust driven turbocharger and the annular exhaust gas recirculation conduit distribution passage and configured to receive and to pass the compressed intake air therethrough.

5. The internal combustion engine of claim 1, further comprising an exhaust gas recirculation system extending between the exhaust system and the annular exhaust gas recirculation conduit distribution passage and configured to receive and to pass exhaust gas to the compressed intake air passing through the intake system.

6. The internal combustion engine of claim 5, further comprising an exhaust recirculation valve operable with the exhaust gas recirculation system that is operable, through a controller, to regulate the quantity of exhaust gas delivered to the compressed intake air passing through the intake system.

7. An internal combustion engine comprises:
an exhaust system to discharge exhaust gas from the internal combustion engine;
an intake system to deliver a compressed intake air to the internal combustion engine;
a venturi assembly disposed in the intake system having a venturi that defines a low pressure zone (Z) for the compressed intake air passing therethrough;
an intake manifold coupled between the engine and the venturi assembly, the intake manifold having an inlet, an outlet, and a sidewall extending therebetween;
an inlet annulus positioned within the intake manifold inlet to define an annular exhaust gas recirculation (EGR) conduit distribution passage extending circumferentially about the inlet annulus between the intake manifold sidewall and the inlet annulus, wherein the EGR conduit distribution passage receives diverted exhaust gas from the exhaust system of the internal combustion engine for delivery to the compressed intake air through a plurality of EGR diffuser passages disposed in the inlet annulus at circumferentially spaced locations about the annular EGR conduit distribution passage,
wherein the venturi assembly further comprises a heater module having a flow passage and at least one heating element, the flow passage configured to receive the compressed intake air.

8. The internal combustion engine of claim 7, further comprising an exhaust driven turbocharger in fluid communication with the exhaust system and the intake system and configured to deliver compressed intake air to the intake system.

9. The internal combustion engine of claim 8, further comprising a compressed intake air cooler disposed in the intake system between the exhaust driven turbocharger and the venturi assembly and configured to receive and to pass the compressed intake air therethrough.

10. The internal combustion engine of claim 8, further comprising an exhaust recirculation valve operable with the exhaust gas recirculation system that is operable, through a controller, to regulate the quantity of exhaust gas delivered to the compressed intake air passing through the low pressure zone (Z) of the venturi.

11. The internal combustion engine of claim 7, further comprising:
an EGR inlet defined in the sidewall of the intake manifold; and
an EGR system extending between the exhaust system and the EGR inlet and configured to receive and to pass exhaust gas through the EGR conduit distribution passage and the EGR diffuser passages to the compressed intake air passing through the low pressure zone (Z) of the venturi.

12. The internal combustion engine of claim 7, wherein the inlet annulus comprises an inlet end having a first diameter (D) and an outlet end having a second diameter (D2), the second diameter larger than the first diameter to facilitate producing the low pressure zone (Z).

13. The internal combustion engine of claim 7, further comprising a throttle body assembly coupled to and upstream of the venturi assembly, the throttle body assembly comprising a valve configured to control the volume of the compressed intake air delivered to the venturi assembly.

14. An internal combustion engine comprising:
an intake system having an intake manifold for receipt of a compressed intake air through a throttle body assembly and delivery of the charge to cylinders of the internal combustion engine;
an exhaust system having an exhaust manifold configured to deliver exhaust gas from the cylinders of the internal combustion engine to a compressor that is located in fluid communication therewith, the compressor including a turbine housing with a high pressure inlet for the exhaust gas, that is in fluid communication through an exhaust gas recirculation conduit with the intake system to deliver diverted exhaust gas to the intake system and, a compressor housing, having a high pressure outlet, that is in fluid communication with the intake system, through a compressed intake air conduit, and configured to deliver the compressed intake air to the intake manifold;
a throttle body, disposed between the compressed intake air conduit and the intake manifold;
a venturi assembly, disposed downstream of the throttle body and comprising an inlet, having a flow passage with a sectional diameter (A), that receives the intake charge therethrough and an outlet, comprising a nozzle section, having a sectional diameter (A1) defining a venturi;
an intake manifold inlet in fluid communication with the venturi assembly, to receive the compressed intake air exiting the venturi;
an inlet annulus extending centrally through the intake manifold inlet and comprising a diameter (D) at an end of the inlet annulus that is equal to the sectional diameter (A1) of the venturi, wherein the inlet annulus extends axially a distance (L), through which its diameter increases to a second diameter (D2), resulting in a low pressure zone (Z) for the compressed intake air passing therethrough;
an annular exhaust gas recirculation conduit distribution passage, extending circumferentially about the inlet annulus and in fluid communication, through an inlet of the annular exhaust gas recirculation conduit distribution passage, with the exhaust gas recirculation conduit, for receipt of diverted exhaust gas from the exhaust system; and
exhaust gas recirculation diffuser passages extending through the inlet annulus and disposed at circumferentially spaced locations about the annular exhaust gas recirculation conduit distribution passage, the exhaust gas recirculation diffuser passages defining spaced through-passages for the inlet and even distribution of diverted exhaust gas from the annular exhaust gas recirculation distribution passage and into the compressed intake air passing through the low pressure zone (Z) of the inlet annulus of the intake manifold.

* * * * *